(12) United States Patent
Ancimer et al.

(10) Patent No.: US 7,386,977 B2
(45) Date of Patent: Jun. 17, 2008

(54) METHOD AND APPARATUS FOR REGENERATING NOX ADSORBERS

(75) Inventors: Richard Ancimer, Vancouver (CA); Olivier Lebastard, Burnaby (CA)

(73) Assignee: Westport Power Inc., Vancouver, BC (CA)

(*) Notice: Subject to any disclaimer, the term of this patent is extended or adjusted under 35 U.S.C. 154(b) by 0 days.

(21) Appl. No.: 11/096,053

(22) Filed: Mar. 30, 2005

(65) Prior Publication Data

US 2005/0257516 A1 Nov. 24, 2005

Related U.S. Application Data

(63) Continuation of application No. PCT/CA03/01462, filed on Oct. 2, 2003.

(51) Int. Cl.
*F01N 3/00* (2006.01)
(52) U.S. Cl. ............... 60/286; 60/295; 60/301; 60/303; 48/197 R; 48/198.3
(58) Field of Classification Search ............ 60/274, 60/278, 279, 286, 295, 297, 301, 303; 48/197 R, 48/198.1, 198.3
See application file for complete search history.

(56) References Cited

U.S. PATENT DOCUMENTS

| | | | |
|---|---|---|---|
| 5,451,558 A | 9/1995 | Campbell et al. | |
| 5,650,127 A | 7/1997 | Campbell et al. | |
| 5,762,885 A | 6/1998 | Debbage et al. | |
| 5,921,076 A * | 7/1999 | Krutzsch et al. | 60/274 |
| 6,138,454 A | 10/2000 | Fournier et al. | |
| 6,170,259 B1 * | 1/2001 | Boegner et al. | 60/286 |
| 6,176,078 B1 * | 1/2001 | Balko et al. | 60/274 |
| 6,244,044 B1 | 6/2001 | Bartley | |
| 6,328,945 B1 | 12/2001 | Hufton et al. | |
| 6,508,057 B1 | 1/2003 | Bouchez et al. | |
| 6,560,958 B1 * | 5/2003 | Bromberg et al. | 60/275 |
| 6,571,551 B2 | 6/2003 | Lundgren et al. | |
| 6,845,610 B2 * | 1/2005 | Shiino et al. | 60/286 |
| 6,976,353 B2 * | 12/2005 | Daniel et al. | 60/275 |
| 7,003,946 B2 * | 2/2006 | Preis et al. | 60/286 |
| 7,093,428 B2 * | 8/2006 | LaBarge et al. | 60/286 |
| 2001/0041153 A1 | 11/2001 | Benz | |

FOREIGN PATENT DOCUMENTS

| | | |
|---|---|---|
| EP | 0537968 A1 | 10/1992 |
| FR | 2787037 | 6/2000 |
| JP | 63068714 | 9/1986 |
| JP | 2002180824 | 12/2000 |
| WO | WO 00/76637 | 12/2000 |
| WO | WO 01/34950 | 5/2001 |

\* cited by examiner

*Primary Examiner*—Binh Q. Tran
(74) *Attorney, Agent, or Firm*—McAndrews, Held & Malloy, Ltd.

(57) ABSTRACT

In a method of regenerating a NOx adsorber, the NOx adsorber is used to treat exhaust gases created during the combustion of gaseous fuels in general. Methane is introduced into a reformer or exhaust line in which hydrogen generated during reforming is used to regenerate the NOx absorber.

7 Claims, 2 Drawing Sheets

METHOD AND APPARATUS FOR REGENERATING NOX ADSORBERS

CROSS-REFERENCE TO RELATED APPLICATION(S)

This application is a continuation of International Application No. PCT/CA2003/001462, having an international filing date of Oct. 2, 2003, entitled "Method And Apparatus For Regenerating NOx Adsorbers". International Application No. PCT/CA2003/001462 claimed priority benefits, in turn, from Canadian Patent Application No. 2,406,386 filed Oct. 2, 2002. International Application No. PCT/CA2003/001462 is also hereby incorporated by reference herein in its entirety.

FIELD OF THE INVENTION

This invention relates to a method and apparatus for regenerating NOx absorbers used in internal combustion engines.

BACKGROUND OF THE INVENTION

Emissions controls for internal combustion engines are becoming increasingly important in transportation and energy applications. Emissions control is becoming especially important for diesel engines. One pollutant of concern is nitrogen oxides (NOx). NOx are generated by the combustion of fuel in internal combustion engines.

Aftertreatment systems for reducing NOx are important in all types of combustion processes. One NOx treatment system is a lean NOx adsorber (LNA). LNA systems need to be periodically regenerated. That is, over time, a reductant is needed to treat NOx traps to permit further NOx removal to take place. It is generally desirable to ensure that regeneration takes place during less than 5% of the operating time of the engine. As such, it is important to ensure that an efficient means of regeneration is employed.

As discussed in, by way of example, PCT/International Publication No. WO 00/76637, there are a variety of reductants available for NOx trap regeneration. By way of example, many hydrocarbons, carbon monoxide (CO) and hydrogen can be used as reductants. Hydrogen is especially effective as a reductant (see U.S. Pat. No. 5,953,911). Also, hydrogen is advantageous in regard to the emissions generated. When hydrogen is used as a reductant—water and nitrogen result. Other carbon-based reductants tend to generate other emissions. For example, the use of CO, as a reductant, produces the greenhouse gas carbon dioxide.

Hydrogen is difficult to store and is generally not readily available. However, hydrocarbons are readily available since internal combustion engines typically use hydrocarbons as fuel. As hydrocarbons comprise hydrogen atoms, they provide a possible source of hydrogen. A hydrocarbon fuel may be passed through a reformer to yield hydrogen.

In a diesel-fuelled compression ignition engine, the hydrocarbon in abundance is diesel fuel. Diesel fuel is not an ideal source of hydrogen, however. It is relatively high in sulfur and therefore may create sulfur management issues in relation to the reformer. Also, partial oxidation of diesel fuel to provide hydrogen, using a partial oxidation catalyst (POX), requires temperatures in excess of 800° C. Aside from the excess energy often needed to generate such temperatures, such temperatures substantially limit the materials suitable for use in devices for reforming diesel fuel. As such, an operating strategy wherein diesel is reformed or partially oxidized to provide hydrogen has not yet generated significant industry acceptance.

As noted above, hydrocarbon reforming requires sulfur management. Sulfur contamination can impair the performance of Ni-based reformers by poisoning such reformers.

NOx emissions may also be reduced by managing the combustion process. NOx emissions can be reduced by using certain gaseous fuels in place of heavy hydrocarbons. Examples of such fuels include natural gas, methane and propane. Even with gaseous fuel, however, NOx emissions are not insignificant.

Developments in gaseous combustion processes have also attempted to address NOx emissions problems. Spark ignited gaseous fuel engines, wherein a premixed charge of air and gaseous fuel is ignited within the combustion chamber, have resulted in further reductions of NOx. However, there have been corresponding penalties in performance of such engines when compared to diesel-fuelled compression-ignition engines.

Some types of gaseous-fuelled compression ignition engine are capable of being fuelled by gaseous fuels instead of diesel without sacrifices in performance or efficiency. In particular, gaseous fuel combustion engines, herein referred to as a high pressure direct injection gas engines, are known in the art. High pressure directly injected gaseous fuel, ignited by an ignition source such as a small quantity of pilot fuel introduced within the engine combustion chamber, yields an improvement over diesel-fuelled engines by reducing the emissions levels of NOx depending on the gaseous fuel chosen. Although such direct injection gaseous fuelled engines have the added benefit of maintaining diesel performance, where that is not usually the case with spark ignited gaseous fuelled engines, there is often a penalty in NOx emissions when such engines are compared directly to spark-ignited engines. Combustion of a high pressure directly injected quantity of gaseous fuel results in diffusion combustion where the bulk of the combustion is believed to occur in a local near-stoichiometric reaction zone. The temperature and resulting NOX formation are relatively high (compared to the temperature and resulting NOx formation resulting from lean burn SI premixed combustion).

Ultimately, for both spark-ignited engines as well as high pressure direct injection compression-ignition engines, there is a need to further manage NOx levels when gaseous fuels are used.

This invention addresses some of the issues discussed above.

SUMMARY OF THE INVENTION

The following invention manages the above problems noted regarding NOx adsorber regeneration in gaseous-fuelled internal combustion engines.

One aspect of the invention provides a method for regenerating a NOx adsorber. The NOx adsorber is used to remove NOx from exhaust gases generated by combustion of a fuel in a combustion chamber of an internal combustion engine. The method comprises directing exhaust gases from a combustion chamber into an exhaust line. The NOx adsorber is disposed in the exhaust line. The method reforms a first quantity of a gaseous hydrocarbon to generate hydrogen and creates a regeneration mix comprising: a quantity of the exhaust gases wherein an oxygen concentration of the quantity of exhaust gases has been reduced, and the hydrogen. The method directs the regeneration mix into the NOx adsorber.

Another aspect of the invention provides an aftertreatment system for treating NOx within exhaust gases. The exhaust gases are produced during combustion of a fuel within a combustion chamber of an internal combustion engine system. The aftertreatment system comprises: an exhaust line connected to carry exhaust gases from the combustion chamber to a NOx adsorber disposed in the exhaust line; an oxidizer capable of providing an oxidized quantity of exhaust gas; a reformer capable of using a gaseous hydrocarbon to generate hydrogen; a first gas line connected to carry a first quantity of the gaseous hydrocarbon from a gaseous hydrocarbon store to the reformer, and a regeneration line connected to carry a regeneration mix to the exhaust line upstream of the NOx adsorber. The regeneration mix comprises the hydrogen and the oxidized quantity of exhaust gas.

Further aspects of the invention and features of specific embodiments of the invention are described below.

BRIEF DESCRIPTION OF THE DRAWINGS

In drawings which illustrate non-limiting embodiments of the invention.

DETAILED DESCRIPTION OF PREFERRED EMBODIMENT(S)

A method of regenerating a NOx adsorber is disclosed where the NOx adsorber is used to treat exhaust gases created during the combustion of gaseous fuels in general. Methane is introduced into a reformer or exhaust line wherein hydrogen generated during reforming is used to regenerate the NOx absorber. Reforming the methane may also produce CO. The CO may also be used to regenerate the NOx absorber.

Figure 1:
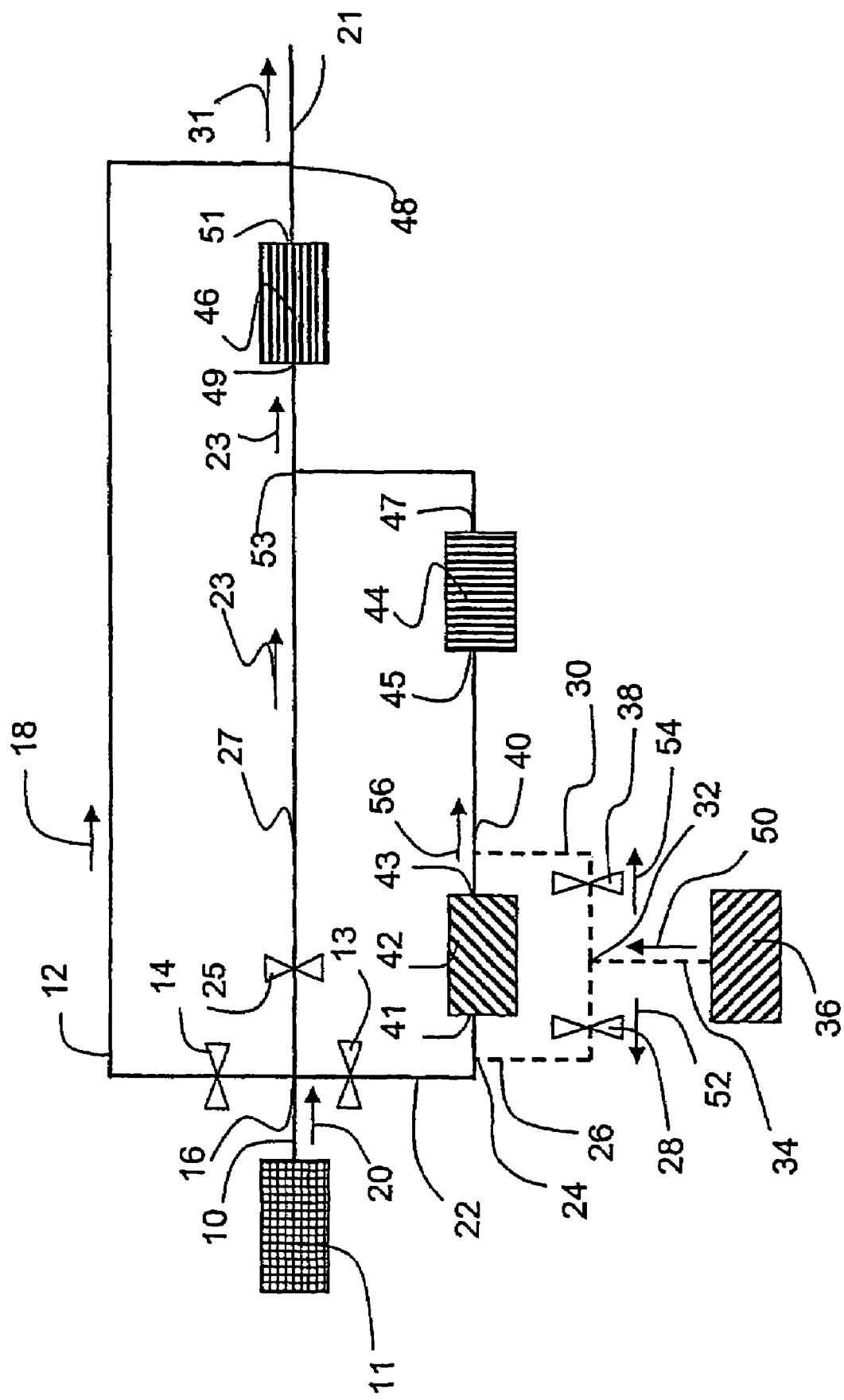
FIG. 1 shows a schematic of a NOx management system according to one embodiment of the invention.

FIG. 1, is a schematic showing a regeneration system according to one embodiment of the invention. An engine exhaust line 10 carries exhaust gases flowing in the direction of arrow 20 from an engine block 11 to a NOx aftertreatment system. In the aftertreatment system, an exhaust line 27 carries exhaust gases to a NOx absorber 46 as indicated by arrow 23. NOx adsorber 46 has an inlet 49 and an outlet 51. Gases exiting outlet 51 are delivered to an outlet line 21 where they flow in the direction of arrow 31.

A by-pass line 12 is provided to carry a proportion of the exhaust gases around adsorber 46 while absorber 46 is being regenerated. The exhaust gases may be directed through by-pass line 12 as indicated by arrow 18 by opening by-pass valve 14 and closing valve 25. By-pass valve 14 may be disposed anywhere along by-pass line 12. In this embodiment, by-pass line 12 branches off from exhaust line 27 at a junction 16 and rejoins exhaust line 27 at a point 48 downstream from NOx adsorber 46.

A reformer line 22 branches off of exhaust line 27 at junction 16. A valve 13 controls the flow of exhaust gases into reformer line 22. An oxidation catalyst 42 and a reformer 44 are connected in series in reformer line 22. Any gases flowing in reformer line 22 flow into the catalyst input 41 of oxidation catalyst 42, out of the catalyst outlet 43 of oxidation catalyst 42, into the reformer inlet 45, through reformer 44 and out of reformer outlet 47. The direction of flow is indicated by arrow 56. Gases flowing in reformer line 22 rejoin exhaust line 27 at a junction 53 upstream from NOx adsorber 46.

Methane gas may be introduced at methane junctions, 24 and 40, which are disposed on either side of oxidation catalyst 42 in reformer line 22. Junction 40 is upstream of reformer 44 and downstream of catalyst 42. Junction 24 is upstream from oxidation catalyst 42.

First methane junction 24 connects reformer line 22 with upstream methane line 26. Upstream valve 28 is disposed in upstream methane line 26. Upstream methane line 26 and downstream methane line 30 are connected to a main methane junction 32 into which main methane line 34 feeds. Methane store 36 flows into main methane line 34 as indicated by arrow 50. Downstream valve 38 is disposed in downstream methane line 30. Downstream line 30 then joins reformer line 22 at second methane junction 40. Methane can flow through upstream and downstream methane lines 26 and 30 to reformer line 22, as indicated by arrows 52 and 54.

Figure 2:
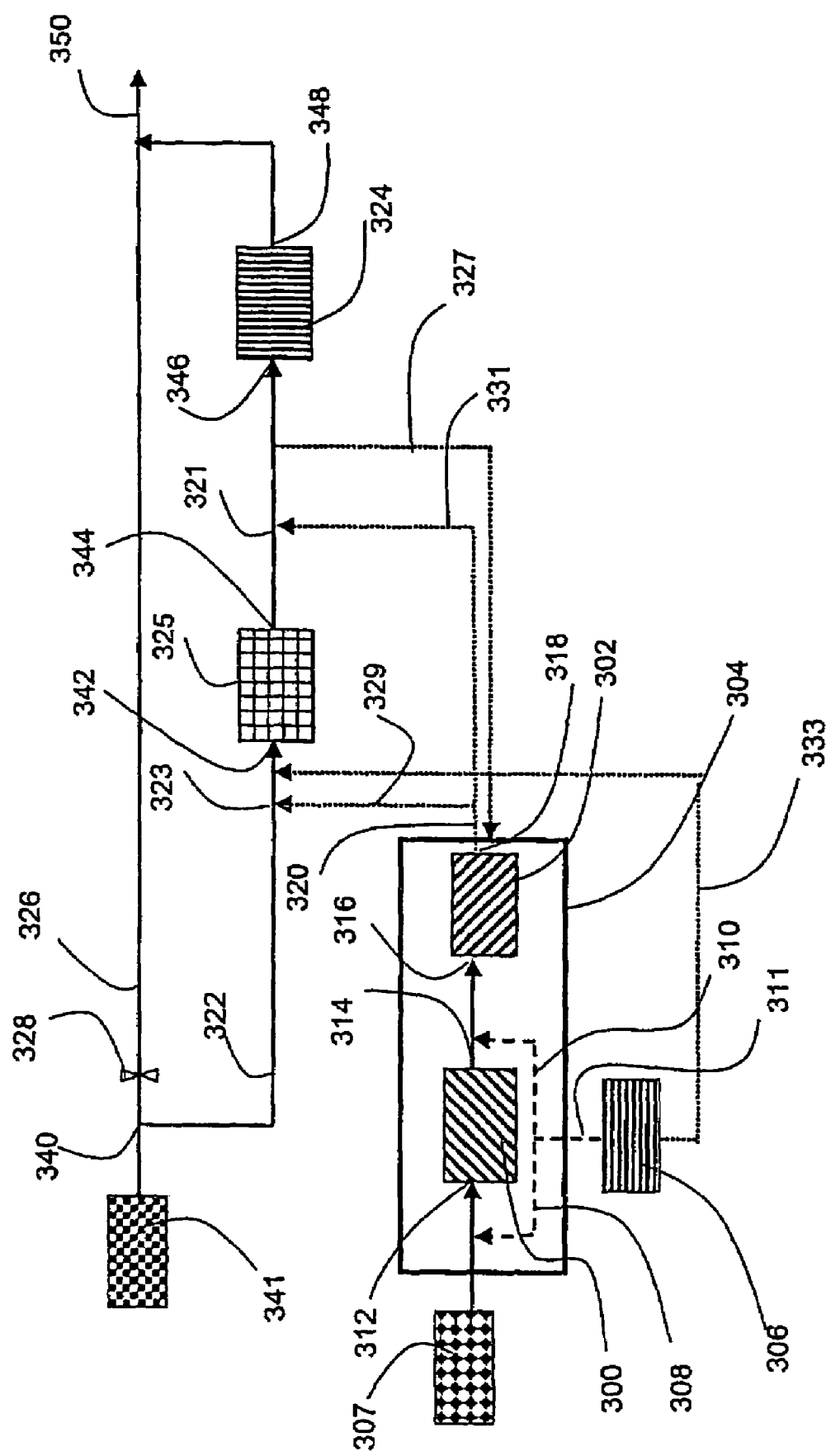
FIG. 2 shows a graphical representation of selected properties of exhaust gas at various points in the system shown in FIG. 1.

In the NOx aftertreatment system of FIGS. 1 and 2, exhaust gas is generated by combustion events within one or more combustion chambers disposed upstream of engine exhaust line 10 in engine block 11. Exhaust gas results from the combustion of natural gas. The gaseous fuel is in general either directly injected into the combustion chamber or pre-mixed with a quantity of air to create a fumigated charge. In each case, spark ignition, glow plug or compression ignition are utilized to initiate the combustion process within the combustion chamber.

During normal operation of the engine valves 14 and 13 are closed and exhaust gas flows along exhaust line 27. The exhaust gas passes through NOx adsorber 46 which removes NOx.

Eventually NOx adsorber 46 will become saturated. During normal operation, NOx adsorber under lean operating conditions will drive NOx to $(NO_3)_2$ by way of:

$$NO + \tfrac{1}{2}O_2(Pt) \rightarrow NO_2 \qquad (1)$$

$$XO + 2NO_2 + \tfrac{1}{2}O_2 \rightarrow X(NO_3)_2 \qquad (2)$$

When NOx adsorber 46 is saturated with $X(NO_3)_2$, it must be regenerated. A regeneration cycle begins. During the regeneration cycle, a proportion of the exhaust gases are diverted to flow through bypass line 12 while the reformer generates $H_2$ and CO from methane. The $H_2$ and CO pass through NOx adsorber 46 where they remove NOx.

A rich environment within exhaust line 27 is preferred to help ensure that $H_2$ and CO regenerate NOx adsorber 46. Therefore, in oxidation catalyst 42 the following occurs:

$$CH_4 + 2O_2 \rightarrow CO_2 + 2H_2O$$

in reformer 44 the following occurs:

$$CH_4 + H_2O \rightarrow CO + 3H_2$$

and in NOx adsorber, regeneration takes CO and $H_2$ created and, in such a rich environment:

$$X(NO_3)_2 \rightarrow XO + 2NO + \tfrac{3}{2}O_2 \qquad (3)$$

$$X(NO_3)_2 \rightarrow XO + 2NO_2 + \tfrac{1}{2}O_2 \qquad (4)$$

$$NO + H_2 \rightarrow H_2O + \tfrac{1}{2}N_2 \qquad (5)$$

$$2NO_2 + 4H_2 \rightarrow N_2 + 4H_2O \qquad (6)$$

$$NO + CO(Rh) \rightarrow N_2 + CO_2 \qquad (7)$$

where X is in a washcoat.

The regeneration cycle is started by opening by-pass valve 14 to allow some exhaust gas to be routed around NOx adsorber 46 and opening valve 13 to allow some exhaust gas to be routed into reformer line 22. In general, a percentage of the total exhaust gas is routed through reformer line 22.

"Depending on the amount of exhaust gas introduced through reformer line 22 during regeneration, a controller commands upstream valve and/or downstream valve, 28 and 38, to direct a quantity of methane (or natural gas) through these valves ensuring that a quantity of the gas is provided on the upstream side of oxidation catalyst 42 and/or the downstream of oxidation catalyst 42. As natural gas is, overwhelmingly, methane with a few additional heavier hydrocarbons, C2 and C3 hydrocarbons in general, it can, where natural gas is fueling the engine, be retrieved from the fuel storage tanks. That is, methane store 36 may be the engine fuel tanks."

Note that by-pass line 12 may branch off of exhaust line 27 at any point prior to junction 53.

The purpose of oxidation catalyst 42 is to burn off excess oxygen within the exhaust gas (a rich environment is needed to drive the initial reaction releasing $(NO_3)_2$ (see equations (3) and (4) above). The regeneration process is not very tolerant to excess oxygen within the regeneration stream. Also, as the reformation process is highly endothermic, it is beneficial to heat the exhaust stream just prior to the introduction of this stream with methane through reformer 44. Catalyst 42 provides a dual function.

Preferably a metal substrate, rather than, for example, a ceramic substrate, is utilized as it improves thermal response to reformer 44 and oxidation catalyst 42. The quicker the thermal response the quicker the regeneration process can be completed reducing the amount of untreated exhaust gas allowed to flow through by-pass line 12. This improves, as well fuel usage-the use of natural gas in regeneration that could otherwise be used to drive the engine.

The upstream quantity of methane to be introduced prior to oxidation catalyst 42 may be adjusted in response to the properties of the exhaust gas flowing out of block 11. By way of example, in one operating situation where the flow of exhaust is constant, low $O_2$ content and/or an exhaust gas at a relatively high temperature will dictate a reduced flow of methane through upstream valve 28 and into exhaust line 22 prior to oxidation catalyst 42. A relatively low exhaust gas temperature from the combustion chamber and into the upstream portion of exhaust line 22 and/or a high concentration of oxygen will dictate a higher flow of methane through valve 28. The quantity of methane introduced upstream may also be controlled in response to exhaust flow. This may depend, by way of example, on the amount which passes through by-pass line 12 or the amount generated during combustion in light of engine operating conditions or the combustion process.

In an in-line set-up as shown in FIG. 1, it is important that the exhaust gas introduced into oxidation catalyst 42 should have a temperature above a given minimum temperature to ensure that the catalyst is "lit-off" initially. One way of managing this is to choose a combustion strategy or combustion timing that ensures either relatively late heat release, as might be the case with spark ignited engines, or a delayed or second direct injection of fuel into the combustion chamber late in the power stroke where regeneration is required. This may also reduce NOx levels with associated benefits during regeneration as a quantity of exhaust gas is directed through the by-pass line without NOx treatment. A reduced NOx level has benefits here. Other strategies are well known to persons skilled in the art.

Similarly, the flow of methane through downstream valve 38 may be controlled in response to the quantity of methane needed within the exhaust gas entering reformer 44. After the exhaust gas has passed through oxidation catalyst 42 its properties are changed. There will be less oxygen within the gas and less methane. This is because oxidation of methane occurs within catalyst 42. This consumes oxygen. As methane serves to provide the source for $H_2$ and CO-preferred components in the regeneration process-the quantity of methane needed within reformer 44 is determined by the amount present within the exhaust stream upstream from reformer 44. The amount of methane preferred is determined by that present in the gases which are exiting oxidation catalyst 42, and the $H_2$ and CO concentrations preferred in light of this initial quantity of methane present (that is, methane not oxidized within catalyst 42).

Once forced through oxidation catalyst 42, the exhaust gas, supplemented with methane via downstream valve 38, is forced through reformer 44. Reformer 44 utilizes the high temperature of exhaust gas heated in oxidation catalyst 42, if any, and the combustion chamber to drive reformation of methane within reformer 44 in reformer line 22 to provide $H_2$ and CO downstream of reformer 44. This stream is directed into exhaust line 27 and NOx adsorber 46 where $H_2$ and CO regenerate NOx adsorber 46.

Note that downstream line 30 is optional. The regeneration controller could provide sufficient methane through upstream line 26 to ensure that enough methane remains after passing through oxidation catalyst 42. In some embodiments of the invention, catalyst 42 and reformer 44 may be combined in a POX and methane may be introduced upstream from the POX. A POX may be provided as a single component within the aftertreatment system. A POX may be used in conjunction with a stand-alone upstream oxidation catalyst or may provide functions of both catalyst 42 and reformer 44.

Oxidation catalyst 42 may be any oxidization catalyst suitable to drive up the temperature of the exhaust gas and any added methane from methane source 36 such that it is at a suitable temperature for reforming. By way of example, oxidation catalyst may convert HC/CO to $CO_2/H_2O$:

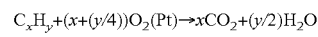
$$C_xH_y+(x+(y/4))O_2(Pt)\rightarrow xCO_2+(y/2)H_2O$$

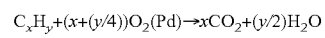
$$C_xH_y+(x+(y/4))O_2(Pd)\rightarrow xCO_2+(y/2)H_2O$$

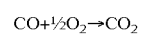
$$CO+\tfrac{1}{2}O_2\rightarrow CO_2$$

By way of example only, washcoats are typically zeolite based or $Al_2O_3$. Other suitable washcoat formulations may also be used.

Reformer 44, as well, can be that found in the art. Reformer 44 is preferably suitable to convert methane with water to CO and $H_2$. By way of example, reformer 44 may comprise a steam reforming catalyst such as a Ni-based catalyst within washcoat materials including calcium aluminate or $Al_2O_3$.

NOx adsorber 46 typically adsorbs and stores of NOx in the catalyst washcoat while operating under lean conditions where $NO_2$ would be released and reduced to $N_2$ under rich operating conditions where a regeneration mixture, that includes hydrogen and rich exhaust gas, is passed through the adsorber. As noted above, the following shows typical operation of the NOx adsorber under lean conditions:

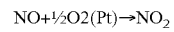
$$NO+\tfrac{1}{2}O2(Pt)\rightarrow NO_2$$

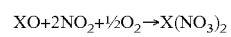
$$XO+2NO_2+\tfrac{1}{2}O_2\rightarrow X(NO_3)_2$$

and under rich conditions:

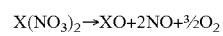
$$X(NO_3)_2\rightarrow XO+2NO+\tfrac{3}{2}O_2$$

$$X(NO_3)_2\rightarrow XO+2NO_2+\tfrac{1}{2}O_2$$

$$NO + CO (Rh) \rightarrow \tfrac{1}{2} N_2 + CO_2$$

$$2NO_2 + 4H_2 \rightarrow N_2 + 4H_2O$$

where X is in the washcoat and is typically an alkali (for example, K, Na, Li, Ce), an alkaline earth (for example, Ba, Ca, Sr, Mg) or a rare earth (for example, La, Yt).

Upon completion of regeneration, by-pass valve 14 and valve 13 are closed as are both upstream and downstream valves 28, 38. All exhaust gas is then driven through NOx adsorber 46. Once saturated, the whole cycle repeats and the NOx adsorber is regenerated as noted above.

The time needed for regeneration and/or the amount of exhaust gas routed through by-pass line 12 during regeneration needs to be considered so as not to release excessive levels of NOx during the regeneration process. The longer the period of time needed for regeneration, the more cumulative exhaust gas flows through by-pass line 12. Preferably, regeneration cycles should be kept to less than 5% of operating time of the engine. Also, a greater volume of exhaust gas routed through by-pass line 12, results in a greater quantity of exhaust gas not passed through NOx adsorber 46-by-pass line 12 does not generally include a separate NOx adsorber. A second NOx adsorber or other NOx management system could be disposed in this line to treat this exhaust gas, this NOx management system adds costs to the overall system.

Likewise, there is a fuel penalty where the flow, volume or length of time through the by-pass line is limited during regeneration. The less gas passes through bypass line 12 during regeneration, the more methane that may be needed to heat exhaust gas for reforming methane. A greater exhaust gas mass volume needs to be heated that much more before reforming begins. Also, where more exhaust gas is forced through the exhaust line during regeneration, the greater quantity of oxygen within the exhaust line. As it is preferable to burn this off prior to regeneration, the result is additional combustion of methane in the regeneration cycle.

One method of operating with the preferred embodiment discussed that helps to reduce regeneration time, is to allow the controller to open valve 13 prior to closing valve 25. This should allow a flow of exhaust gas through reformer line 22, lighting off oxidation catalyst 42 and warming the reformer line upstream of reformer 44 to warm this reformer prior to a regeneration cycle. When valve 25 is closed at the beginning of a regeneration cycle, there is less time needed to heat reformer line 22 and less time before regeneration can commence. In other words the regeneration process is initiated by opening valve 13 prior to a regeneration cycle.

Alternatively, the flow rate within reformer line 22 can be set to ensure a certain amount of exhaust gas is always flowing through reformer line 22 eliminating the need for valve 13. As oxidation catalyst 42 and reformer 44 are disposed in this line, the flow rate with valve 25 opened could be regulated by valve 25. In other words, a maximum flow rate through valve 25 could reduce the flow rate through reforming line 22 to a negligible amount. As valve 25 is increasingly restricted, increased flow through reforming line 22 could be secured as necessary to allow reforming line 22 to heat up appropriately prior to a regeneration cycle.

Balancing fuel efficiency and emissions limits, preferably 80% by-pass represents the upper limit of the exhaust gas volume directed through by-pass valve 14 during regeneration.

By way of example, typical properties can be described for exhaust gas exiting from the combustion chamber at various points along the system embodiment described above and shown in FIG. 1 during a regeneration cycle where valve 14 and valve 13 are opened and valve 25 is close.

Prior to regeneration, the main difference across the system is the reduction of NOx. By way of example this reduction may range from 100 to 500 ppm exiting from the combustion chamber. After being directed through the NOx adsorber, the NOx concentration may be reduced to less than 50 ppm.

Once the controller directs regeneration of the NOx adsorber opening up by-pass valve 14 and reformer valve 13 and upstream and/or downstream valves 28 and 38, typical properties of the gas at various points along the regeneration line can be summarized in the following table. As would be understood by a person skilled in the art, the table provides only one example of typical ranges of operating condition during regeneration:

TABLE 1

Typical Properties of Gas Along Regeneration Line

|  | Junction 15 | Junction 24 | Exit 43 | Entry 45 | Exit 47 | After Adsorber 51 | Line 12 |
|---|---|---|---|---|---|---|---|
| $O_2$ (%) | 2-8 | 2-8 | 1.9-8 | 1.9-8 | 0 | 0 | 2-8 |
| $CO_2$ (%) | 5-8 | 5-8 | 5-10 | 5-10 | 5-10 | 5-10 | 5-8 |
| $H_2O$ (%) | 5-15 | 5-15 | 5-18 | 5-18 | 5-18 | 5-18 | 5-15 |
| $CH_4$ (%) | 500 | 3000-50000 | <500 | <500 | <500 | <500 | 500 |
| NOx (ppm) | 100-500 | 100-500 | 100-500 | 100-500 | 100-500 | <1000 | 100-500 |
| Co (ppm) | <1000 | <1000 | <100 | <100 | <20000 | 0 | <1000 |
| $SO_2$ (ppm) | <5 | <5 | <5 | <5 | <5 | <5 | <5 |
| P (bar) | 1 | 1 | 1 | 1 | 1 | 1 | 1 |
| T (° C.) | 400-600 | 350-600 | 600-700 | 600-700 | 400-600 | 250-400 | 350-600 |

The selection of the amount of methane introduced across upstream valve 28 and downstream valve 38 may be determined by, amongst other things, the temperature downstream from oxidation catalyst 42, the oxygen content within the exhaust stream and the amount of hydrogen desired for regeneration. Typically, by way of example, 9500 ppm of methane is typically needed per 100° C. exhaust gas temperature rise. An appropriate temperature for the resulting exit gas out of catalyst 42 at exit 43 is 650° C. The preferred range is between 600° C. to 700° C. A sensor prior to oxidation catalyst 42 may be used to allow a controller to direct upstream valve 28 to meet the methane demands for a given temperature demand.

Open loop control may be used to determine the quantity of natural gas to direct upstream of oxidation catalyst without need for temperature measurements. Similarly, the properties of the NOx adsorber will dictate how a controller directs downstream valve 38 to supply methane to the reformer to ensure that the necessary amount of $H_2$ is available at reformer exit 47 to facilitate regeneration of NOx adsorber 46.

The following has been shown to be a typical trend found in systems according to this invention during regeneration cycles. Typically, at junction 16, which represents the exhaust gas upon exit from the combustion chamber, the methane concentration is relatively low. At inlet 41 of the embodiment shown in FIG. 1, a quantity of methane is introduced from upstream line 26. The exhaust gas temperature cools by the time it reaches inlet 41. Upon exit from oxidation catalyst 42 at outlet 43, the methane concentration falls with a corresponding rise in the exhaust temperature. The temperature may be driven to something near 700° C. The temperature preferred for this embodiment is in the range of 600 to 700° C. By the time the exhaust gas has been directed through to inlet 45 of reformer 44, a second quantity of methane is provided to the exhaust line through downstream line 30. The temperature of the exhaust gas has fallen slightly due, in part, to the addition of methane, however, it remains at or above 700° C. The $H_2O:CH_4$ ratio at this point, prior to entry into the reformer, should be higher than 2:1 and preferably higher than 2.5:1 (that is, more water for same amount of methane). This ration at reformer inlet 45 helps to prevent coking and improve efficiency of reformation process.

At reformer outlet 47, the methane concentration falls again with a consequential rise in hydrogen and CO concentrations. The temperature falls across the reformer by approximately 100° C. as this reformer includes a partial oxidation catalyst, in this embodiment, wherein the POX generates heat prior to or during the endothermic reforming process. The temperature fall is a typical trade-off between the endothermic reforming process and exothermic oxidation of the fuel.

At inlet 49 to NOx adsorber 46, the temperature of the exhaust gas falls. Across NOx adsorber 46 and by the time the exhaust gas is delivered from the adsorber, the hydrogen concentration is reduced to negligible levels. The methane concentration is largely unaffected across the NOx adsorber. Any remaining methane can be oxidized out prior to expulsion from the exhaust system. As well, additional remaining hydrogen can be removed with a downstream clean-up catalyst.

Efficiencies are provided by a ready on-board supply of natural gas where this is the fuel used to drive the engine. As natural gas is for the most part methane, its use as the fuel ensures a ready supply of a hydrogen source.

An inline external heater could be used to help light off oxidation catalyst 42 and promote reformation in reformer 44 and oxidation of exhaust gas during regeneration. This could be used to help heat the exhaust gas to encourage oxidation and/or to the reformer operate efficiently. While, it is preferable that the majority of heat is provided by the exhaust gas, things such as, by way of example and not limited to:

transient response,
efficiency considerations,
combustion strategies that utilize a quick heat release,
valve timing, or
cylinder design that takes advantage of a large expansion ratio may release exhaust gas that could benefit from such a heater in order to initiate oxidation prior to or during regeneration.

Also, where such a heater is employed in-line, oxidation catalyst 42 may benefit from in-line proximate generation of hydrogen. A heat exchanger could direct a quantity of heat from outlet 47 or heat from gases unused after regeneration out of outlet 51 back through to a point along reformer line 22 upstream of catalyst 42. This could be used to help reduce the load on such heater after it initially lights the catalyst off.

The preferred embodiment discussed above, may also be used without that part of line 27 joining by-pass line 12 to reformer line 22. In such an embodiment, exhaust gas would constantly flow through catalyst 42 and reformer 44 before reaching NOx adsorber 46. During regeneration, by-pass valve 14, would open allowing flow through by-pass line 12 and a process would begin to create a rich environment prior to NOx adsorber 46 by lighting off oxidation catalyst which would, in turn, initiate reformation of methane as described above. The regeneration cycle would operate as described above, as valve 25 was closed during regeneration effectively eliminating this part of exhaust line 27.

While this variation on the in-line embodiment reduces complexity by removing aftertreatment piping and valves 25 and 13, it does not provide the flexibility of the embodiment described above. It could however, utilize a control strategy that would introduce methane into the line and cause the oxidation catalyst to begin heating exhaust gases for a period prior to regeneration. It would be preferred that the heat of the exhaust gas or quantity of methane not reach a level that it would begin significant reformation prior to the regeneration cycle. However, as with the embodiment of pre-heating discussed above, by heating the catalyst for a period prior to regeneration, the regeneration time can be reduced.

As would be understood by a person skilled in the art, where a Ni-catalyst is used care should be taken to avoid formation of any carbonyl, such as nickel carbonyl, in the exhaust environment in which reforming is taking place. Temperature, CO and oxygen concentration, as two examples, should be managed to ensure that carbonyl problems are avoided. For combustion that results in relatively low exhaust temperature, such as diffusion combustion of natural gas, Ni-based catalyst should preferably be avoided. A POX might be substituted.

FIG. 2 shows a schematic of a NOx treatment system according to a second embodiment of the invention. Oxidation catalyst 300 and reformer 302 are both removed from their in-line configuration found in the embodiment of FIG. 1. As with the above embodiment, reformer 302 can be a POX as well. Heater 304 is introduced to assist the reforming process. Air or $O_2$ reservoir 307 is provided. Natural gas source 306 along with upstream line 308 and downstream line 310 are provided each of which branches off of methane line 311. As well, oxidation entry 312 and exit 314 and reformer entry and exit 316, 318, are shown. Introduction line 320 runs from exit 318 through to a NOx downstream junction 321 or NOx upstream junction 323 on exhaust line 322 through NOx upstream line 329 and NOx downstream line 331, as the case may be. Second oxidation catalyst 325 is provided. Methane line 333 provides a route to direct methane from natural gas source 306 through to exhaust line 322 upstream of oxidation catalyst 325. By-pass line 326 and by-pass valve 328 are shown where by-pass line branches off of NOx line 322 at by-pass junction 340. Engine out 341 directs exhaust gas to the aftertreatment system. Along NOx line 322, catalyst inlet 342 and catalyst outlet 344 are shown on either side of catalyst 325. NOx inlet 346 and NOx outlet 348 are also provided on either side of NOx adsorber 324. System out 350 is shown beyond the junction where by-pass line 326 rejoins with NOx line 322.

Supplemental heat conductor or exchanger 327 downstream of catalyst 325 may used to direct excess heat from just prior to NOx adsorber 324 back to heater 304.

In the off-line embodiment of FIG. 2, reforming is done in an environment free of exhaust gas. This embodiment is adaptable to natural gas fueled applications that utilize a combustion process or engine design that results in exhaust temperatures that are not high enough to initiate oxidation across a catalyst. In such a case, an off-line system can be controlled independent of exhaust gas temperatures.

Off-line reformer 302 generates and directs hydrogen to the exhaust gas stream during regeneration.

An additional component to this system is heater 304. This heater can be used with a quantity of air (or $O_2$) from air reservoir 307 and methane source 306 to feed upstream line 308 or downstream line 310 into reform line 320 prior to or after oxidation catalyst 300. The resulting gas from outlet 314 and into inlet 316, which may or may not include an additional quantity of methane from source 306 through downstream line 310, is used to reform methane within the stream to create a gaseous mixture, including hydrogen and CO, from outlet 318. This mixture is then directed to junction 321 in exhaust line 322 where exhaust gases from an internal combustion engine are directed through NOx adsorber. The regeneration mixture is directed through the NOx adsorber.

The reformed hydrogen and CO can be directed upstream or downstream of oxidation catalyst 325. Utilizing oxidation catalyst 325 by introducing the inlet from the off-line reformer upstream of catalyst 325 may provide efficiencies as exhaust gas temperature can be supplemented by oxidizing the exhaust gas with a quantity of hydrogen. This may help to heat the exhaust gas enough to light off oxidation catalyst 325. Additional methane remaining after the reforming process within line 320 and directed to line 329 can be used to reduce the oxygen concentration within the exhaust line. Also, methane line 333 can be used to direct methane to oxidation catalyst 325 to help light-off this catalyst and reduce the oxygen concentration found in the exhaust gases flowing through exhaust line 322 during a regeneration cycle.

Excess heat generated by such oxidation catalyst 325 or the oxidation of hydrogen can be transferred through heat exchanger 327 back to heater 304 thereby lessening the load on heater 327. The advantages of an in-line oxidation catalyst can be utilized where, following initial heating of off-line catalyst 300 and reformer 302, oxidation catalyst 325 may incorporate reformer 302 into exhaust line 322 through heat exchanger 327. That is, after initial heating, methane may be directed through to catalyst 325 where after being initially heated may be lit off in catalyst 325 to provide heat for reformer 302 through heat exchanger 327 and oxidation of the exhaust gas. Similarly, a separate line from exhaust line 322 to off-line catalyst prior to catalyst 312 may be used wherein catalyst 325 is by-passed. This may be appropriate where the off-line catalyst has been initially lit off, or exhaust gas could be used to help lit off the catalyst. In this case, the off-line catalyst effectively behaves in the same manner as the in-line apparatus discussed above.

Additionally, during a regeneration cycle, it may be advantageous to direct $H_2$ and CO through to line 331 while by-passing all exhaust gas through line 326 (valve 328 may, in such case, need to be disposed in line 322). There are advantages in some circumstances arising from limiting the need to remove oxygen from the exhaust gas and simplifying the system by providing an opportunity to remove catalyst 325. While heat from an inline catalyst would not be available to provide heat to the off-line reformer or off-line catalyst, heat from the by-pass line or upstream of NOx adsorber 324 provided by the exhaust gas could be used.

Many of the same considerations mentioned in relation to the first embodiment discussed need to be addressed in this embodiment. That is, the oxygen concentration into exhaust line 322 from reform line 320 needs to be controlled so as to ensure that regeneration is effective. Also, the balance of methane introduced into upstream line 308 and downstream line 310 needs to be controlled to ensure adequate supply of hydrogen and CO. Also, the same considerations related to control of valve 328 leading to by-pass line 326 are needed to optimize fuel efficiency and emissions.

With reference to the second embodiment of the subject invention, typical operating conditions along points along exhaust line 322 during regeneration of NOx adsorber 324 are described as follows.

A reduction in the oxygen concentration occurs across catalyst 325. $H_2$ and CO are provided through junction 321 at inlet 346 of NOx adsorber 324. Regeneration across NOx adsorber 324 depletes $H_2$ and CO concentrations. Once by-pass exhaust is mixed back in with exhaust line 322 by the time system out 350 is reached, the oxygen concentration spikes back up.

As noted above, $H_2$ is introduced into exhaust line 322 prior to oxidation catalyst 325 helping to light off this catalyst. This reduces the amount of methane that might have to be used to oxidize oxygen with the line, as is preferred prior to regeneration. Excess heat from oxidation of $H_2$ and methane, the later across catalyst 325, allows heat to be redirected back to heater 304, if desired. The heat demanded of heater 304 can be corresponding reduced where $H_2$ and methane oxidation are managed to generate an adequate excess of heat for reformation to take place.

Note for the reformers discussed above, steam is required in order to generate $H_2$ and CO for regeneration. This need tends to be met as exhaust gas has sufficient quantities of water. For off-line reformers, water levels may need to be supplemented. However, POX catalyst should be able to reform without the need for supplemental water. Other reformers could be used as understood by a person skilled in the art.

A further advantage may be realized where a fuel is used that combines methane and hydrogen as two major components. By way of example, natural gas with 20% hydrogen might be appropriate. Such a fuel could then be utilized in the embodiments discussed wherein the hydrogen introduced with the fuel prior to the oxidation catalyst could help to light off those catalysts. Further, by providing a quantity of hydrogen into the exhaust stream, the burden on the reformer is reduced. A smaller reformer may be adequate to provide the total hydrogen required for regeneration.

Exhaust gas recirculation (EGR) can also be utilized to help reduce NOx emissions during regeneration when a by-pass line is opened. Increased EGR rates during regeneration can reduce NOx generated in the combustion chamber resulting in less NOx flowing through the by-pass line and into the atmosphere. Further, increases in EGR may also be used to reduce the concentration in oxygen in the exhaust gas during regeneration, reducing, in turn the burden on the oxidation catalyst to reduce oxygen during a regeneration cycle as well as reduce the amount of methane needed to burn off oxygen.

Where the fuel or supply of methane is from CNG, where sulfur levels tend to be higher than is the case for LNG (generally, the two options for providing methane), the combustion of the fuel resulting in the exhaust gas found in an in-line reformer will help to dilute any methane source introduced into the line prior to reformation as combustion of the gas results in the conversion of sulfur products to less harmful by-products (such as sulfur dioxide) from a contamination point of view. As such, the relatively high concentration of sulfur within methane will be diluted by exhaust gas reducing the potential for poisoning of the reformer. Where an off-line reformer is used, CNG may not be an appropriate source of methane, as the dilution noted above is not available, for example, a CNG source for methane may not be appropriate due to the high concentrations of problematic sulfur and the resulting poisoning of the reformer or a filter may be needed upstream to remove the sulfur. However, as many such applications benefit from utilizing LNG (for example, by increasing the range of gaseous fueled vehicles), where this source of methane has almost no sulfur, it will not generally result in a sulfur poisoning problem.

While methane is the preferred source for hydrogen, as would be understood by a person skilled in the art, other lighter hydrocarbons, generally, gaseous hydrocarbons, could be used including but not limited to other gaseous hydrocarbons such as ethane, propane and butane.

For the purposes of the application, reformers contemplate, but are not limited to, steam reformers and POX.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. An aftertreatment system for treating NOx within exhaust gases produced during combustion of a fuel within a combustion chamber of an internal combustion engine system, the aftertreatment system comprising:
   (a) an exhaust line connected to carry exhaust gases from the combustion chamber to a NOx adsorber;
   (b) a reformer generating hydrogen and carbon monoxide from a gaseous hydrocarbon;
   (c) an oxidizer reducing the oxygen concentration of a first quantity of air;
   (d) a first gas line connected to deliver a first quantity of the gaseous hydrocarbon from a gaseous hydrocarbon store to the reformer;
   (e) a regeneration line directing a regeneration mix into the exhaust line upstream of the NOx adsorber and downstream of the combustion chamber, the regeneration mix comprising the hydrogen and carbon monoxide from the reformer and the first quantity of air from the oxidizer, the reformer and the oxidizer disposed in the regeneration line; and
   wherein an output of the oxidizer is connected to an input of the reformer and an output of the reformer is connected to the regeneration line.

2. The aftertreatment system of claim 1 wherein the fuel is a gaseous fuel.

3. The aftertreatment system of claim 2 wherein the gaseous fuel is directly injected into the combustion chamber.

4. The aftertreatment system of claim 3 wherein the gaseous fuel comprises methane.

5. The aftertreatment system of claim 4 wherein the gaseous fuel is directly injected into the combustion chamber.

6. The aftertreatment system of claim 4 wherein the gaseous fuel comprises the gaseous hydrocarbon.

7. The aftertreatment system of claim 6 wherein the gaseous fuel is directly injected into the combustion chamber.

* * * * *